United States Patent [19]
Ljung

[11] Patent Number: 6,078,813
[45] Date of Patent: Jun. 20, 2000

[54] HANDOVER QUALITY CONTROL IN A MOBILE COMMUNICATIONS SYSTEM

[75] Inventor: Petter Ljung, Stockholm, Sweden

[73] Assignee: Telefonaktiebolaget L M Ericsson (publ), Stockholm, Sweden

[21] Appl. No.: 08/991,377

[22] Filed: Dec. 16, 1997

[51] Int. Cl.⁷ .................................................. H04Q 7/00
[52] U.S. Cl. ............................ 455/436; 455/437; 455/63
[58] Field of Search ..................... 455/437, 436, 455/69, 439; 370/332, 333; 375/200

[56] References Cited

U.S. PATENT DOCUMENTS

| | | | |
|---|---|---|---|
| 4,696,027 | 9/1987 | Bonta | 455/436 |
| 4,718,081 | 1/1988 | Brenig | 379/60 |
| 4,765,753 | 8/1988 | Schmidt | 379/60 |
| 5,056,109 | 10/1991 | Gilhousen et al. | 375/342 |
| 5,159,593 | 10/1992 | D'Amico et al. | 370/95.3 |
| 5,267,261 | 11/1993 | Blakeney, II et al. | 370/332 |
| 5,285,447 | 2/1994 | Hulsebosch | 370/69.1 |
| 5,287,544 | 2/1994 | Menich et al. | 455/422 |
| 5,491,717 | 2/1996 | Hall | 370/332 |
| 5,491,837 | 2/1996 | Haartsen | 455/62 |
| 5,621,723 | 4/1997 | Walton, Jr. et al. | 370/335 |
| 5,901,354 | 5/1999 | Menich et al. | 455/422 |

FOREIGN PATENT DOCUMENTS

| | | |
|---|---|---|
| 0 515 335 | 11/1992 | European Pat. Off. . |
| 0 667 726 | 8/1995 | European Pat. Off. . |
| 0 768 804 | 4/1997 | European Pat. Off. . |
| WO 95/12297 | 5/1995 | WIPO . |
| WO 95/35003 | 12/1995 | WIPO . |

OTHER PUBLICATIONS

PCT Standard Search Report, Sep. 2, 1998.

*Primary Examiner*—Wellington Chin
*Assistant Examiner*—Blane J. Jackson
*Attorney, Agent, or Firm*—Jenkens & Gilchrist, P.C.

[57] ABSTRACT

A method and system for controlling the quality of handovers are disclosed in which a poor radio environment in a target cell is revealed prior to completion of the handover procedure. During the handover signalling phase, the output power of the mobile station of interest and the target cell's base transceiver station are reduced. Consequently, prior to completion of the handover, if the target cell has a poor radio environment (below a predetermined C/I or C/N), the handover attempt will fail, and the mobile station will revert and remain connected to the original cell.

20 Claims, 2 Drawing Sheets

HANDOVER QUALITY CONTROL IN A MOBILE COMMUNICATIONS SYSTEM

BACKGROUND OF THE INVENTION

1. Technical Field of the Invention

The present invention relates in general to the mobile communications field and, in particular, to a method and system for controlling the quality of handovers in a mobile communications system.

2. Description of Related Art

Inter-cell handovers (i.e., from one cell to another) are made in mobile communications systems for various reasons. For example, a mobile station (MS) can be handed over from one cell to another if the radio connection is poor on the original connection. Handovers can also be used for load balancing between cells (e.g., an MS can be moved from a congested cell to a cell with less traffic). However, in many handover situations, the new cell may offer a relatively low carrier-to-interference ratio (C/I) or carrier-to-noise ratio (C/N). Consequently, a handover to such a cell can result in poor speech quality and disrupted calls.

In existing mobile communications systems, there are no mechanisms in place to prevent handovers to cells with a too low C/I or C/N. As such, once a base station controller (BSC) has decided to move an MS from one cell to a new cell, the handover procedure is executed without any attempt to examine beforehand the quality of the radio environment of the new cell. In fact, a standard handover procedure is to perform the handover signalling phase at a safe output power level, in order to ensure a successful handover thereafter. As described below, these drawbacks of existing mobile communications systems in not ensuring the quality of a new cell's radio environment prior to handover are successfully corrected by the present invention.

SUMMARY OF THE INVENTION

In accordance with the present invention, a method and system for controlling the quality of handovers are provided in which a poor radio environment in a target cell is revealed prior to completion of the handover procedure. During the handover signalling phase, the output power of the MS of interest and the target cell's base transceiver station (e.g., BTS in GSM) are reduced. Consequently, prior to completion of the handover, if the target cell has a poor radio environment (e.g., below a predetermined C/I or C/N), the handover attempt to the target cell will fail, and the MS will revert and remain connected to the original cell.

An important technical advantage of the present invention is that it can prevent handovers to cells that offer low C/I or C/N.

Another important technical advantage of the present invention is that it provides a handover procedure that improves speech quality of the resulting connection and reduces the rate of dropped calls.

Still another important technical advantage of the present invention is that it provides a handover procedure that can be implemented by software in an existing BSC.

Yet another important technical advantage of the present invention is that it provides an improved handover procedure that can be implemented consistent with the existing mobile communications systems' (e.g., GSM) technical specifications.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1A:
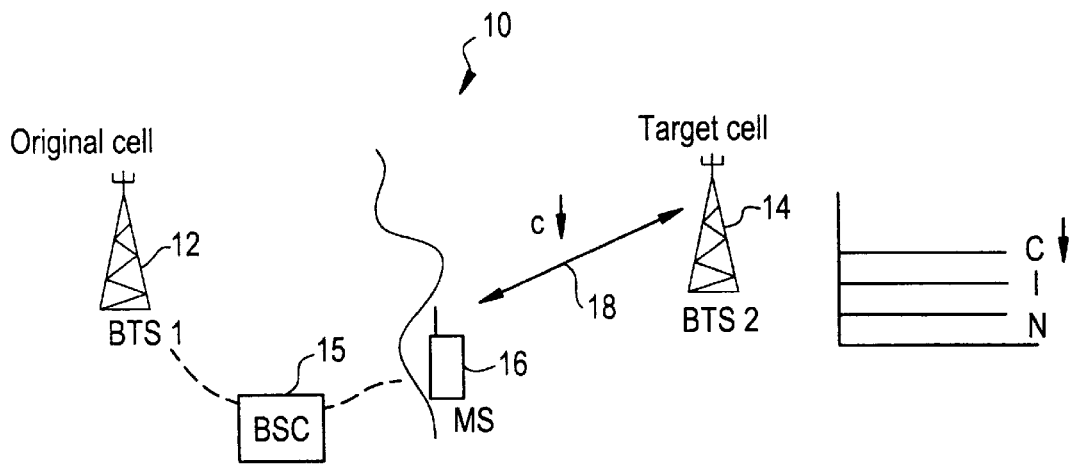
FIGS. 1A–1C are related diagrams of an exemplary mobile communications system that can be used to illustrate an improved handover procedure, which can be implemented in accordance with a preferred embodiment of the present invention.
Figure 1B:
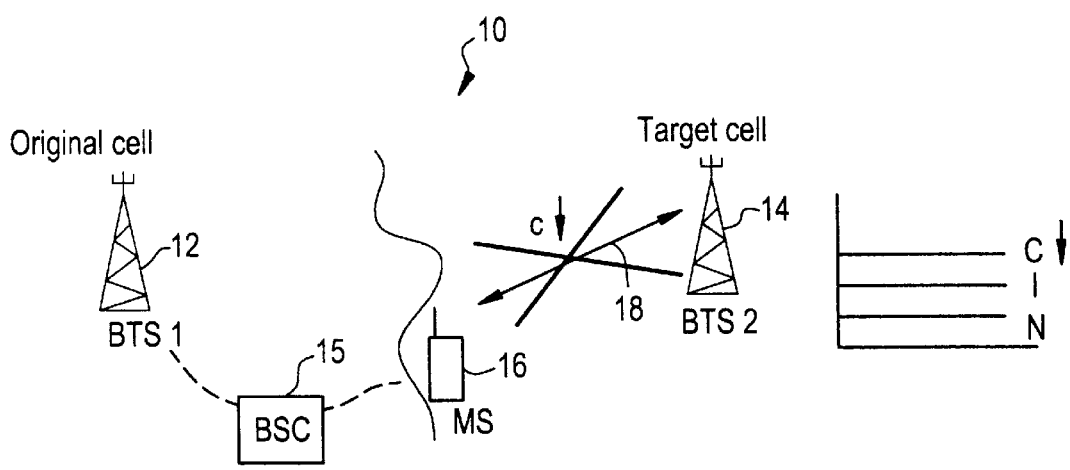
Figure 1C:
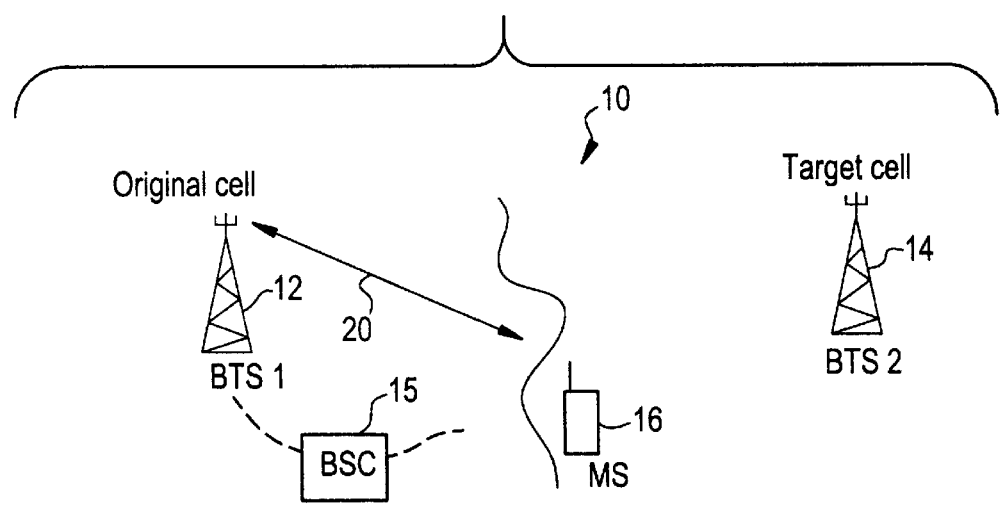
Figure 2:
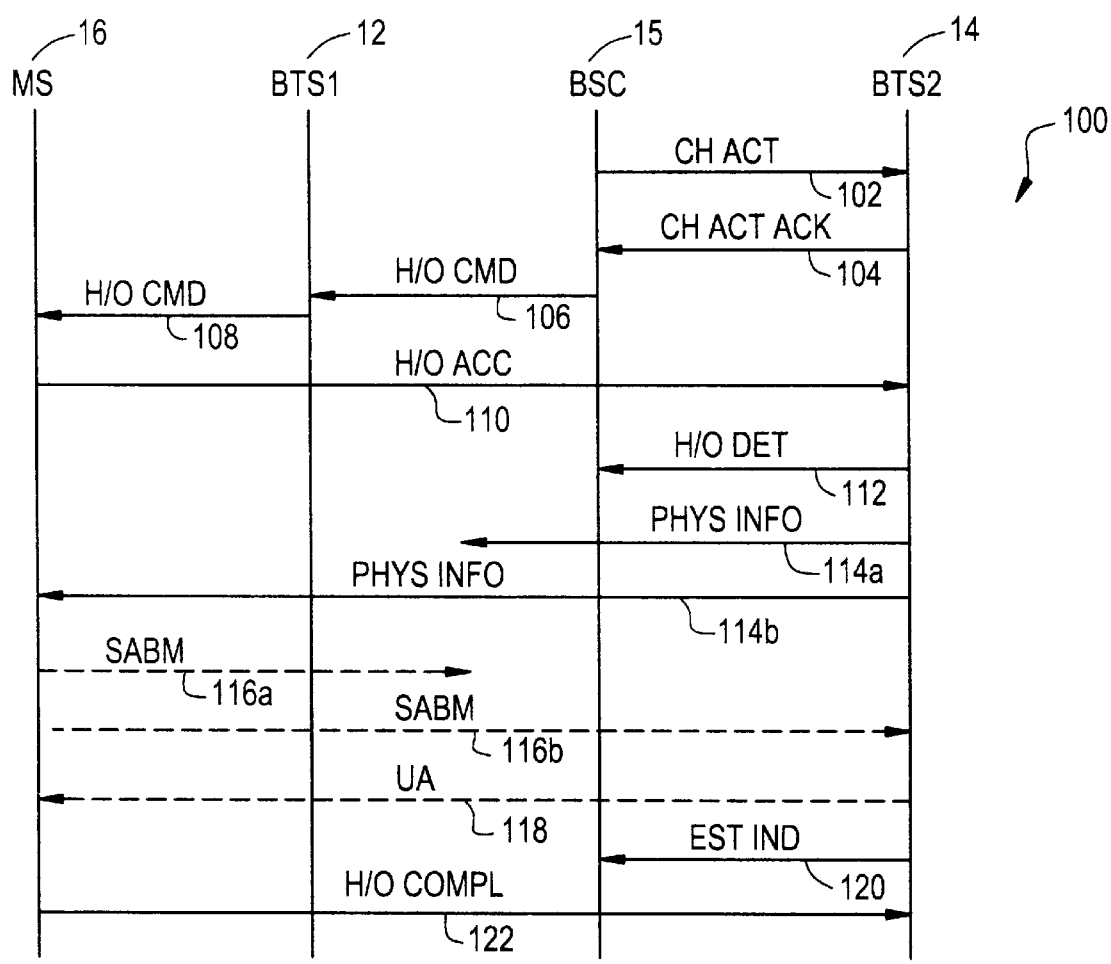
FIG. 2 is a sequence diagram that illustrates an exemplary method for improving the quality of handovers, which can be used in accordance with the present invention and as illustrated by the system shown in FIGS. 1A–1C.

The preferred embodiment of the present invention and its advantages are best understood by referring to FIGS. 1–2 of the drawings, like numerals being used for like and corresponding parts of the various drawings.

Essentially, in accordance with the present invention, an improved handover method is provided in which a poor radio environment in a target cell is revealed prior to completion of the handover procedure. During the handover signalling phase, the output power of the MS of interest and the target cell's base transceiver station are reduced. Consequently, prior to completion of the handover, if the target cell has a poor radio environment (e.g., below a predetermined C/I or C/N), the handover attempt to the target cell will fail, and the MS will revert and remain connected to the original cell.

Specifically, FIGS. 1A–1C are related diagrams of an exemplary mobile communications system 10 that can be used to illustrate an improved handover procedure, which can implemented in accordance with a preferred embodiment of the present invention. FIG. 2 is a sequence diagram that illustrates an exemplary method 100 for improving the quality of handovers, which can be used in accordance with the present invention and as illustrated by the system shown in FIGS 1A–1C. For this exemplary embodiment, the system 10 shown is the Global System for Mobile Communications (GSM). However, this embodiment is for illustrative purposes only, and the present invention is not intended to be limited to any particular mobile communications system.

Referring to FIGS. 1A and 2, mobile communications system 10 includes a plurality of cells, which are typified by the base transceiver stations (BTS1) 12 and (BTS2) 14 that define individual cells, as shown in FIG. 1A. A cell boundary is depicted by the wavy line. Note that in certain systems, these cells can be defined by radio base stations, but the term BTS is used for the GSM. In system 10, a base station controller (BSC) 15 has selected a "better" cell as a handover target cell. As such, a mobile radio terminal (MS) 16 is to be handed over from an original cell (e.g., BTS1 12) to a target cell (e.g., BTS2 14).

In accordance with the sequence diagram shown in FIG. 2, the BSC 15 attempts to allocate a traffic channel (TCH) in the target cell. If a TCH can be allocated in the target cell, at step 102, the BSC 15 sends a channel activation message to the target BTS2 14. For the GSM, the channel activation message includes the handover reference number, MS power, and type of channel requested. Responsive to the channel activation message, the target BTS2 14 starts receiving on the TCH for detection of handover access bursts, and also begins transmission and reception on the Slow Associated Control Channel (SACCH). At step 104, the target BTS2 14 sends a channel activation acknowledgment message to the BSC 15 to acknowledge the activation message.

At step 106, the BSC 15 sends a handover command message to the MS 16 via the original BTS1 12 (step 108)

on the main signalling channel (Fast Associated Control Channel or FACCH), which orders the MS 16 to switch to the new channel. The handover command message also includes the channel description for the new channel, and the handover reference number that the MS 16 will use for identification. At step 110, responsive to the handover command, the MS 16 releases the old channel, switches to the assigned channel, and begins transmitting handover access messages on the main signalling channel.

In accordance with the present invention, as indicated by the air interface connection 18 shown in FIG. 1A, the handover access messages are transmitted by the MS 16 at a reduced power level (e.g., 4 dB below the safe output power for the GSM). If the C/I (or C/N) in the main signalling channel is greater than or equal to a predetermined level, the reduced transmission power level of the MS 16 does not affect reception of the handover access request bursts by the target BTS2 14. Consequently, at step 112, the target BTS2 14 sends a handover detection message to the BSC 15, which indicates that the MS 16 has tuned to the new dedicated channel. The target BTS2 14 then begins transmitting physical information to the MS 16 (step 114a or 114b).

If, on the other hand, the C/I (or C/N) in the main signalling channel is less than the predetermined level (e.g., FIG. 1B), the reduced transmission power level of the MS 16 does affect the reception of the handover access request bursts by the target BTS2 14. Consequently, at step 112, the target BTS2 14 does not send a handover detection message to the BSC 15, and the physical information is not transmitted to the MS 16 (step 114a or 114b). If the MS 16 does not receive physical information from the target BTS2 14, a timer (e.g., a "T3124" timer) in the MS 16 (started when the MS 16 received the handover command) expires after a predetermined time. As shown in FIG. 1C, the MS 16 then reactivates the old channel in the original cell (BTS1 12), and sends a handover failure message to the BSC 15. The present invention thus prevents a handover to the "bad" (low C/I or C/N) target cell, and the MS remains connected with the original cell as if no handover attempt occurred.

Returning to step 112 (as described above), if the C/I (or C/N) in the main signalling channel is greater than or equal to the predetermined level, the reduced transmission power level of the MS 16 does not affect reception of the handover access request bursts by the target BTS2 14. Consequently, at step 112, the target BTS2 14 sends a handover detection message to the BSC 15, which indicates that the MS 16 has tuned to the new dedicated channel. The target BTS2 14 then begins transmitting the physical information to the MS 16 (step 114a or 114b). Notably, in accordance with the present invention, at about the same time the transmission power level of the MS 16 is reduced, the BSC 15 also orders the target BTS2 14 to reduce its transmission power level (e.g., 4 dB below the safe output power for the GSM). At step 114a, as indicated by the shortened "physical information" line, if the C/I (or C/N) in the main signalling channel is less than the predetermined level (e.g., FIG. 1B), the physical information (e.g., MS output power, timing advance, etc. in the GSM) transmission from the target BTS2 14 to the MS 16 is affected by the reduced transmission power level of the target BTS2 14. Consequently, at step 114a, the transmitted physical information is not received by the MS 16. Again, if the MS 16 does not receive the physical information from the target BTS2 14, the timer in the MS 16 expires after the predetermined time. The MS 16 then reactivates the old channel in the original cell (BTS1 12), the present invention thus prevents the handover to the "bad" target cell, and the MS remains connected with the original cell.

If, on the other hand, at step 114b, the physical information transmitted from the target BTS2 14 is received by the MS 16, at step 116a (or 116b), the MS 16 terminates the transmission of the handover access bursts, and resumes multi-frame operations by sending a Set Asynchronous Balanced Mode (SABM) message to the target BTS2 14. However, if the C/I (or C/N) in the main signalling channel is less than the predetermined level, at step 116a, the transmission of the SABM message is affected by the reduced transmission power level of the MS 16, which causes a "layer 2" signalling failure to occur. The BSC 15 orders the MS 16 to reactivate the old channel in the original cell (BTS1 12), the present invention thus prevents the handover to the "bad" target cell, and the MS remains connected with the original cell.

If the SABM message transmission from the MS 16 is still received by the target BTS2 14 (even at the reduced power level), at step 118, the target BTS2 14 sends an Unnumbered Acknowledgment (UA) frame to the MS 16. However, if the C/I (or C/N) in the main signalling channel is less than the predetermined level, at step 118, the transmission of the UA message is affected by the reduced transmission power level of the BTS2 14, which also causes a "layer 2" signalling failure to occur. The BSC 15 orders the MS 16 to reactivate the old channel in the original cell (BTS1 12), the present invention thus prevents the handover to the "bad" target cell, and the MS remains connected with the original cell.

Otherwise, if the C/I or C/N of the main signalling channel is greater than or equal to the predetermined value, the target cell is considered a "good" cell, and the handover procedure is completed. As such, at step 120, an Establish Indication message is sent from the target BTS2 14 to the BSC 15. At step 122, the MS 16 transmits a handover complete message to the new BTS2 14.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for improving the quality of a handover procedure in a mobile communications system, comprising the steps of:

reducing a transmission power level of a mobile terminal to a predetermined value;

transmitting a handover signaling message at said reduced mobile terminal transmission power level, said handover signaling message transmitted from said mobile terminal to a target base station; and if said target base station fails to detect said handover signaling message having a received signal level above a first predetermined threshold, terminating said handover procedure.

2. The method of claim 1, further comprising the steps of:

reducing a transmission power level of said target base station to a predetermined value;

transmitting physical information at said reduced target base station transmission power level, said physical information transmitted from said target base station to said mobile terminal; and if said mobile terminal fails to detect said physical information having a received signal level above a second predetermined threshold during a predetermined period, terminating said handover procedure.

3. The method of claim 2, further comprising the steps of:

transmitting a resume multi-frame operation message at said reduced mobile terminal transmission power level, said resume multi-frame operation message transmitted from said mobile terminal to said target base station; and if said target base station fails to detect said resume multi-frame operation message having a received signal level above a third predetermined threshold, terminating said handover procedure.

4. The method of claim 3, further comprising the steps of:

transmitting a resume multi-frame operation acknowledgment message at said reduced target base station transmission power level, said acknowledgment message transmitted from said target base station to said mobile terminal; and if said mobile terminal fails to detect said acknowledgment message having a received signal level above a fourth predetermined threshold, terminating said handover procedure.

5. The method of claim 1, wherein said mobile communications system comprises the GSM.

6. The method of claim 1, wherein said handover signaling message is conveyed on a main signaling channel.

7. The method of claim 5, wherein said handover signaling message is conveyed on a fast associated control channel.

8. A system for improving the quality of a handover procedure, comprising:

a mobile terminal;

a target base station; and a base station controller coupled to said mobile terminal and said target base station, said base station controller operable to reduce a transmission power level of said mobile terminal to a predetermined value during a handover signaling phase for said handover procedure, wherein said mobile terminal transmits a handover access message at said reduced mobile station transmission power level to said target base station, a termination of said handover procedure occurring if said mobile terminal fails to detect a handover access message response from said target base station having a received signal level above a first predetermined threshold.

9. The system of claim 8, wherein said handover procedure comprises a GSM handover procedure.

10. The system of claim 8, wherein said termination of said handover procedure occurs if said mobile terminal fails to detect said response within a predetermined period.

11. The system of claim 8, wherein said response from said target base station includes physical information.

12. The system of claim 8, wherein said base station controller is further operable to terminate said handover procedure if said target base station fails to detect a resume multi-frame operation message transmitted at said reduced mobile station transmission power level from said mobile terminal to said target base station.

13. The system of claim 12, wherein said base station controller is further operable to terminate said handover procedure if said mobile terminal fails to detect a resume multi-frame operation acknowledgment message transmitted at a reduced target base station transmission power level from said target base station to said mobile terminal.

14. The system of claim 8, wherein said target base station fails to send said response because said handover access message, as received by said target base station, has a signal level below a second predetermined threshold.

15. The system of claim 8, wherein said base station controller is further operable to reduce a transmission power level of said target base station to a predetermined value during said handover signaling phase.

16. A method for improving the quality of a handover procedure in a mobile communications system, comprising the steps of:

reducing a transmission power level of a target base station to a predetermined value;

transmitting a handover signaling message from said mobile terminal to said target base station;

transmitting a response to said handover signaling message from said target base station to said mobile terminal, said response transmitted at said reduced target base station transmission power level; and if said mobile terminal fails to detect said response having a signal level above a first predetermined threshold, terminating said handover procedure.

17. The method of claim 16, wherein said response includes physical information.

18. The method of claim 16, further comprising the steps of:

transmitting a resume multi-frame operation message from said mobile terminal to said target base station;

transmitting a resume multi-frame operation acknowledgment message at said reduced target base station transmission power level from said target base station to said mobile terminal; and if said mobile terminal fails to detect said acknowledgment message having a received signal level above a second predetermined threshold, terminating said handover procedure.

19. The method of claim 3, wherein said first predetermined threshold equals said third predetermined threshold.

20. The method of claim 4, wherein said second predetermined threshold equals said fourth predetermined threshold.

* * * * *